(12) United States Patent
Lattin et al.

(10) Patent No.: US 11,577,582 B2
(45) Date of Patent: Feb. 14, 2023

(54) HVAC AIR DISTRIBUTION DEVICE TO PROMOTE TEMPERATURE STRATIFICATION

(71) Applicant: DClimate Inc, Maryland Heights, MO (US)

(72) Inventors: Robert Lattin, Maryland Heights, MO (US); Sesha Madireddi, Maryland Heights, MO (US); Martin Duffy, Maryland Heights, MO (US)

(*) Notice: Subject to any disclaimer, the term of this patent is extended or adjusted under 35 U.S.C. 154(b) by 383 days.

(21) Appl. No.: 16/148,645

(22) Filed: Oct. 1, 2018

(65) Prior Publication Data

US 2019/0100080 A1    Apr. 4, 2019

Related U.S. Application Data

(60) Provisional application No. 62/637,523, filed on Mar. 2, 2018, provisional application No. 62/565,882, filed on Sep. 29, 2017.

(51) Int. Cl.
*B60H 1/34* (2006.01)
*B60H 1/00* (2006.01)

(52) U.S. Cl.
CPC ....... *B60H 1/3407* (2013.01); *B60H 1/00378* (2013.01); *B60H 2001/3485* (2013.01)

(58) Field of Classification Search
CPC ........... B60H 1/3407; B60H 2001/3485; F24F 2013/0608; F24F 13/068
USPC ....................................................... 454/152
See application file for complete search history.

(56) References Cited

U.S. PATENT DOCUMENTS

| | | | | |
|---|---|---|---|---|
| 2,857,108 A | * | 10/1958 | Wallace | A01G 9/246 237/53 |
| 3,719,136 A | * | 3/1973 | Criddle | F24F 8/10 454/187 |
| 4,050,365 A | * | 9/1977 | Freeman, Jr. | B60H 1/00014 454/108 |
| 5,746,653 A | * | 5/1998 | Palmer | F24F 13/068 454/186 |

(Continued)

FOREIGN PATENT DOCUMENTS

| | | | | |
|---|---|---|---|---|
| DE | 3605539 A1 | * | 8/1987 | F24F 13/068 |
| DE | 3817365 A1 | * | 11/1989 | B60H 1/00014 |
| NL | 1033645 C2 | * | 10/2008 | F24F 13/068 |

OTHER PUBLICATIONS

"Machine Translation of DE3817365A1". 2021.*

(Continued)

*Primary Examiner* — Vivek K Shirsat
(74) *Attorney, Agent, or Firm* — Gutwein Law; Greg N. Geiser

(57) ABSTRACT

An HVAC air distribution device to promote temperature stratification within a larger volume. The device comprised of a front side coupled to a back side defining a cavity for directing a flow of air. The front side comprised of a pliable material and configured for the distribution of the flow of air within the channel. Accordingly, the front side comprises an air permeable portion to release flow from the channel to provide a low velocity of uniform air flow across a length of the device. This low velocity uniform air flow encourages temperature stratification within a distinct area of the larger volume to increase comfort of an occupant and promote efficiency of HVAC systems.

11 Claims, 6 Drawing Sheets

(56) References Cited

U.S. PATENT DOCUMENTS

| | | | | |
|---|---|---|---|---|
| 10,502,475 B2* | 12/2019 | Khan | ....................... | B60P 3/20 |
| 2004/0089007 A1* | 5/2004 | Umebayashi | ........ | B60H 1/3407 |
| | | | | 62/244 |
| 2007/0072537 A1* | 3/2007 | Bateman | .............. | F24F 13/068 |
| | | | | 454/296 |

OTHER PUBLICATIONS

"Machine Translation of NL1033645C2". 2021.*
"Machine Translation of DE3605539A1". 2021.*
Lindab Comfid theory Displacement diffusers, 2015.*

* cited by examiner

HVAC AIR DISTRIBUTION DEVICE TO PROMOTE TEMPERATURE STRATIFICATION

CROSS REFERENCE TO RELATED APPLICATIONS

This application claims priority to U.S. Provisional Patent Application No. 62/565,882 filed 29 Sep. 2017 and U.S. Provisional Patent Application No. 62/637,523 filed 2 Mar. 2018 to the above named inventor(s), and are herein incorporated by reference in their entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present disclosure relates to a heating, ventilating, and air conditioning (HVAC) cooling air distribution system applied to vehicles having a sleeping cab to generally promote and increase the comfort of a user of the system, wherein a zone of controlled temperature may be established within a larger enclosure without the use of a physical barrier.

BACKGROUND

Within a vehicle, such as a sleeper cab of a tractor trailer, the primary method of air distribution for HVAC systems is typically accomplished by one or more high velocity (high energy) jets of air emanating from a specific nozzle or nozzles. When these jets are implemented and positioned correctly, the high velocity jets of air promote mixing of conditioned air with unconditioned air and help to facilitate uniform temperature distribution within the conditioned region. A location of a vent may be strategically placed within a structure to improve mixing and promote even temperature distribution within the controlled space by directing the jetted air.

This method is traditionally a desirable arrangement and is typically used in vehicles where is it common for one or more of these user directed vents to be used to aim a jet of conditioned air toward the occupant and within the vehicle. When this approach is implemented correctly, the user achieves an acceptable level of comfort.

Although the method described promotes uniform temperature distribution and therefore promotes occupant comfort, this traditional system typically over conditions the volume they are implemented within by conditioning air in places where the occupant is not located. Additionally, rapid air movement within the lightly insulated walls of a vehicle can increase the convective heat transfer coefficient and require the temperature conditioning system to work harder than necessary to keep the occupant comfortable. Both of these conditions require more energy to be expended than is optimally required.

Forced air temperature conditioning has further negative effects when implemented incorrectly. For instance, some regions of the vehicle may suffer from a blast of high velocity conditioned air while other locations within the control zone of a vehicle have stagnant air and are improperly conditioned.

Typical air distribution systems used to promote comfort within vehicles or other defined spaces convey conditioned air from an air-conditioner device toward the location where conditioned air is required through a generally rigid and immovable system of duct-work or tubes. Further, this ductwork is commonly but, not exclusively, located behind one or more interior trim pieces. As such, once the air distribution ductwork has been placed and installed, it becomes essentially a permanent part of the interior space it is utilized within. When the ductwork is concealed below or behind interior panels it has the advantage being hidden from view of users and also has the advantage of being out of the way of humans such that the air conveyance method presents little possibility to harm or provide discomfort to the occupant by casual or intentional interaction.

When rigid or permanent ductwork is located in front of the interior trim and not concealed from the occupant the air conveyance method may present a hazard to an occupant if they ever accidentally, unintentionally, or harmfully contact the exposed structures. In addition, permanent rigid ductwork limits the space that could be used by an occupant since the rigid structure excludes the occupant from making use of the space whether conditioned air conveyance is required or not. Finally, this rigid ducting and the associated method of air conveyance behind or in front of an interior panel is difficult to relocate, as it is commonly and rigidly attached to some other interior structure.

Some additional methods are commonly utilized to provide additional conditioned areas within a sleeper cab, wherein a physical barrier forms independent temperature zones through the separation of one region of the sleeper cab from another region of the sleeper cab, such as the driving area of the cab, by using moveable curtains. Although this approach does help to confine and limit the area of temperature control, closing the curtain darkens the sleeper region and promotes a claustrophobic feeling when inside.

Truck drivers also like to periodically look outside the truck windshield to ensure their load is safe and not being tampered with. For these reasons, truck drivers typically do not prefer to use interior curtains. Therefore, HVAC equipment specifically designed to condition the truck bunk space must work harder than the ideal case to keep the occupant comfortable when using traditional methods of air distribution and barrier curtains.

SUMMARY OF THE INVENTION

The present disclosure provides a device and method for use designed to deliver and direct a broad zone of low velocity conditioned air flow and thereby selectively provide conditioned air to a local region such as a sleeper bunk within a larger volume such as a truck cabin. Motivation for this method and device is realized as conditioning only a portion of a larger volume providing an energy intensity requirement that is lower than traditional solutions.

In the preferred embodiment of the present disclosure, the device is configured with a stiff but flexible back side portion which is used to provide a basic structure to the device and serve as a surface to mount a front side portion the device. Preferably, the front side portion of the device is generally flexible and pliable as this front side will be exposed within the interior space of a living quarter area of a vehicle. The various construction details of the disclosed device make it safe and flexible for the occupant of the interior to interact with and further, the flexible assembly provides for customization and movement if the occupant desires to relocate the air conveyance and distribution device.

The front side of the device is configured with a permeable structure so that air may flow from an interior portion of the device to an external portion of the device position on the outside of the device front side external to the interior portion when a pressure differential exists, such that the interior of the device has a higher pressure than the external portion on the outside. The disclosed device includes a unique mount system whereby the disclosed device may be compatible with existing interior systems and is easily retrofitted to the existing system by generally low skilled personnel or may be seamlessly installed during primary manufacture of the vehicle cabin.

DETAILED DESCRIPTION OF THE INVENTION

Figure 1:
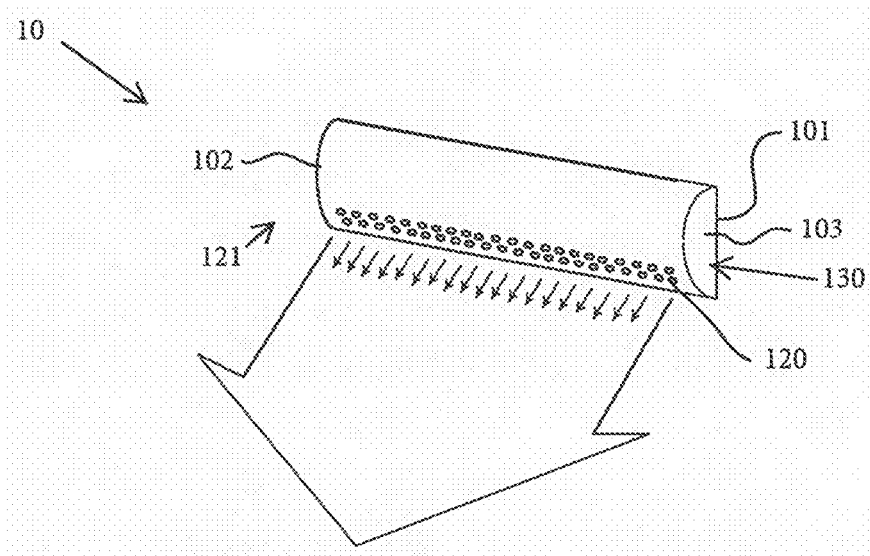
FIG. 1 is an isometric view of the disclosed device showing directed air flow, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the figures, FIG. 1 to FIG. 10 show the air distribution device of the present disclosure generally configured to move air to promote temperature stratification. In a first embodiment of the present disclosure, the device 10 comprises a cavity for air passage having stiff impermeable back side 101 and a pliable air permeable front side 102. Air permeability of the front side 102 is achieved by using a material, including, but not limited to, a flexible plastic or rubber-like material with a plurality of holes 120, or a loose woven fabric where the spaces in between individual threads form holes 120 or are generally porous allowing for the escape of conditioned air.

In the preferred embodiment of the present disclosure, the holes 120 within the front side 102 are intentionally formed into the pliable material of the device 10 by intentionally forming an open space allowing for the egress of air from the device 10 interior. These holes 120 may be configured into a fabric front portion 120 by weaving porosity or open spaces into the fabric of a controlled size and aligned proximity to each other. Further, the holes 120 may be added to the front side 102 by a secondary operation such as, but not limited to, laser cutting, thermal piercing, or mechanical punching or drilling. Accordingly, the holes within the front side 102 are provided in a plurality of small sized holes each allowing a small jet of air to be formed normal to a front surface of the front side 102 of the disclosed device 10. When in use, the plurality of holes 120 in the front side 102 of the invention allow for a corresponding number of air jets to work in cooperation and form a low velocity uniform flow field of air with minimal large scale turbulence and therefore limited mixing with stagnant unconditioned air.

The effect of the system of the device 10 is to provide a low velocity flow of conditioned air that is directed toward a particular region or zone within a larger volume. The zone generally being defined as a smaller area within the larger volume where a specific temperature can be achieved without the use of a mechanical barrier if necessary. When properly installed and implemented for cooling, the device 10 will cause thermal stratification or a blanket of conditioned air over a sleeping occupant within the large volume of the vehicle cab. Thermal stratification is generally defined as a layering effect that allows for the creation of larger pockets of air with different temperatures by using the density of air at varying temperatures to alter a specific zone within the larger volume. The thermal stratification caused by the device 10 is more pronounced when the conditioned air is cooler than the non-conditioned air due to the slightly higher density of cool air cascading over the occupant from a relatively higher position where the device 10 is placed. The thermal stratification effect is further enhanced when a return air entrance is positioned in such a manner so as to primarily capture the conditioned air discharged from the device 10 and when mixing the conditioned air and non-conditioned air before it is returned to the HVAC equipment. Captured air may therefore be further conditioned via air conditioning equipment so it can be returned to the device 10 whereby it is again distributed.

The device front side 102 and back side 101 are coupled together either directly in an assembly or with the addition of side members. Accordingly, the front side 102 and the back side 101, with or without the side members, cooperate to form a channel 103 functioning as a passage defined by an inside 130 positioned between the front side 102 and back side 101 and an outside 121 positioned exterior to the front side 102 opposite the inside 130, wherein the front side 102 separates the inside 130 from the outside 121. The channel 103 allowing for the flow of air flow and is generally considered as a duct or passageway for air.

The device 10, in an alternate embodiment, is configured with ends adapted to contain air within the channel 103 when the channel 103 has a length greater than a width of the channel 103 to allow for efficient operation of the device 10. The device 10 channel 103 is aligned with and coupled to at least one primary air entrance for generating the air within the device 10, but may be fed with air from multiple entrances. In a typical assembly of the device 10 the entrance is on the back surface 101 and on one or both ends of a longitudinal run of the channel 103. Air within the device 10 is discharged and distributed by the multiple small holes 120 or the porosity of the material of the front side 102 of the invention.

When air is admitted to an inlet(s) representing an entrance of the device 10 during operation, the relative pressure within the primary flow channel 103 of the device 10 is higher on the inside 130 of the channel 103 than the outside 121. As such, when constructed out of a fabric material for the front side, the device 10 maintains a relative state of inflation even though air is allowed to pass through the invention from the entrance into the channel 103 to the outlet holes 120 on the front side 102 of the device 10. This state of inflation helps to form an operational shape of the front side 102 of the device 10 and direct air jets normal to the front side 102 when fabric is used as the front side 102.

When air is admitted to the air entrance of the device 10 during operation, the relative velocity and direction of air within the channel 103 between the front side 102 and the back side 101 of the device 10 is established within the device 10. During normal operation airflow is positioned primarily parallel to the front side 102 and back side 101 surfaces of the device 10 and in line with the axis of the flow. Air velocity within the channel 103 is relatively high when compared to the exit velocity of each outlet hole on the exterior of the front side 102.

Upon exiting from the front side 102 of the device 10, air flow is directed normal to the front side 102 only and the peak velocity of any of the individual jets exiting the holes 120 is typically lower than the peak velocity of the inside 130 of the channel 103 of the device 10. Therefore, airflow typically changes direction and reduces in velocity as the airflow moves from the inside 130 of the front side 102 to the outside 121 of the front side 102 as it exits the holes 120.

Relative air pressure within the channel 103 formed by the front 102 and back 101 walls of the device 10 are typically greater adjacent and near the conditioned air entrance to the flow channel 103. This effect is more pronounced when the flow channel 103 has a high ratio of length to hydraulic diameter. The hydraulic diameter equating to a diameter or cross-section of the volume of the channel 103. When the holes 120 are formed in the front side 102 of the device 10, it may be desirable to vary the size of the holes 120. As such, when holes 120 are formed in the front side 102 of the device 10 to provide an outlet for conditioned air, holes 120 having a smaller size are positioned nearer the entrance to the channel 103 when compared to holes 120 positioned a distance away from the entrance, wherein the hole 120 size progressively increases as the distance between the hole 120 location and the entrance increases. In this configuration, the volume of airflow exiting the channel 103 out of each hole 120 of the plurality of holes 120 is adapted to be approximately the same across the device 10 length.

In operation of the device 10, the relative flow velocity within the primary flow channel 103 of the device 10 is highest near the region where conditioned air enters the flow channel 103. This effect is more pronounced when the flow channel has a high ratio of length to hydraulic diameter. As such, the hydraulic diameter formed by the channel 103 may be varied in proportion to regulate the flow, wherein the hydraulic diameter of the channel 103 is greater nearer the conditioned air entrance and the hydraulic diameter of the channel 103 is reduced further from the entrance. Accordingly, this dimensioned configuration of the hydraulic diameter of the channel 103 maintains a constant velocity of air flow along the axis of the channel of the device 10.

As the relative pressure within the primary flow channel 103 of the device 10 is highest near the region where conditioned air enters the channel 103, an alternate embodiment of the present device 10 can be utilized to balance air flow. This effect is more pronounced when the flow channel 103 has a high ratio of length to hydraulic diameter. Accordingly, for a given purpose, it may be desirable to vary the number of holes 120 placed within the front side 102 of the device 10. Although, when this construction method for balancing air flow is used, the volume of airflow discharged may be constant across the length of the device 10, but the discharge velocity may change.

Hole 120 size, location, and location relative to surrounding and adjacent holes 120 may also be altered to promote an uneven distribution of conditioned air throughout the zone intended to be conditioned. As an example, more conditioned air may be directed toward an occupant's head or body and less conditioned air is directed toward the occupant's legs and feet. In this manner, the device 10 can direct maximum cooling to the most critical regions while saving overall HVAC system capacity by not directing cooling toward less important regions of the larger volume.

When the device 10 is used in practice to condition a volume, the above variations may be used individually or in combination to produce and shape a customized zone of conditioned air within a larger environment, such as the vehicle cab.

Mounting of the device 10 is accomplished by applying adhesive tape to a rear portion of the back side 101 of the device 10 and using hook and loop fasteners to secure the device 10 to a mounting surface within volume, such as the truck cab. Alternately, the device 10 may be physically secured with mounting hardware such as, but not limited to, clips, screws, or other similar fastener.

Figure 2:
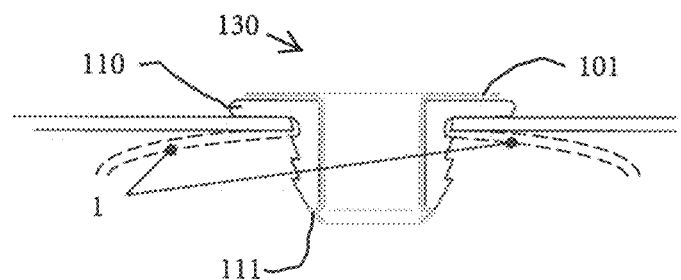
FIG. 2 is a cross-sectional view of the coupling between the disclosed device and existing ductwork, according to the present disclosure.

Referring now to FIG. 2, the device 10 may be coupled to an existing ductwork system 1 by a unique connection system whereby a mounting aperture may be drilled, punched or otherwise cut into existing interior and sub surface ductwork of a vehicle. A flexible coupling grommet 110 is inserted into the aperture with a coupling tube 111 of the device 10 inserted into the flexible coupling grommet 110 thereby forming a sealed passage for air to flow from the vehicle air distribution system into the entrance of the device 10 for distribution. Once conditioned air from the vehicle HVAC system enters the device 10, existing air vents within the vehicle cabin may be left open and used to further direct air as desired by the occupant, or the existing vehicle vents may be closed. In the event the vehicle vents are closed, the generally porous front side 102 of the device 10 is allowed to distribute air toward the occupant with the greatest benefit of HVAC energy reduction.

Figure 3:
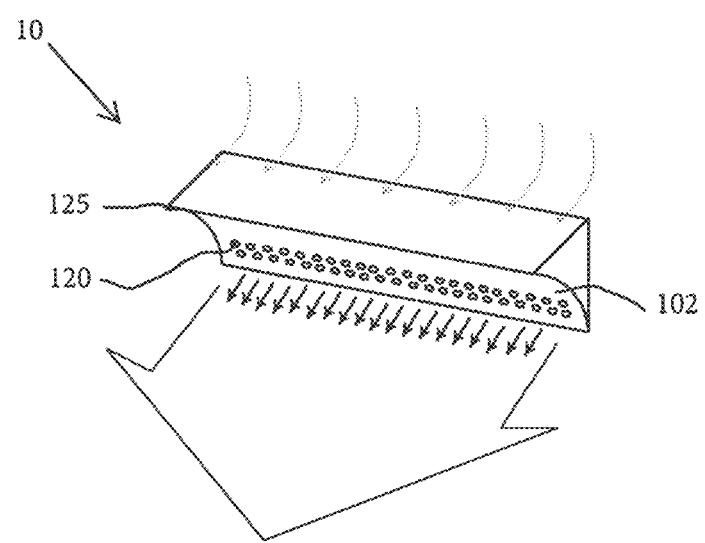
FIG. 3 is an isometric view of an alternate embodiment of the disclosed device, according to the present disclosure.
Figure 4:
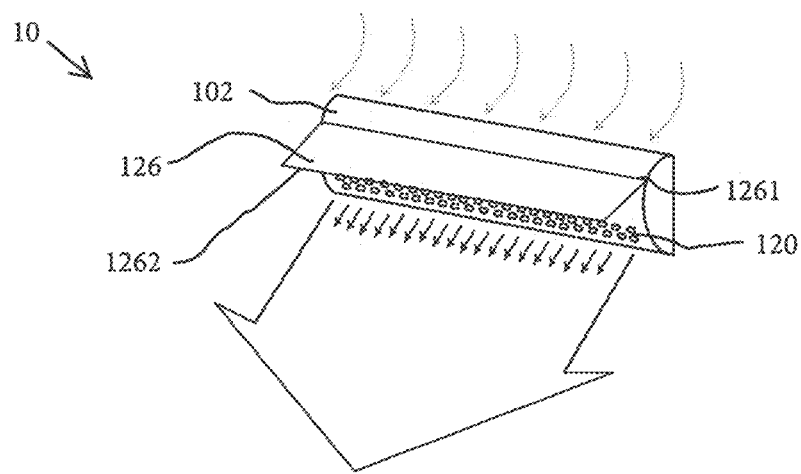
FIG. 4 is an isometric view of an alternate embodiment of the disclosed device, according to the present disclosure.
Figure 5:
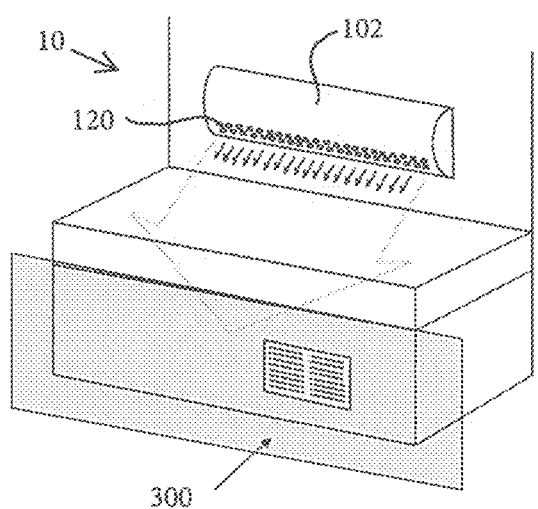
FIG. 5 is an isometric view of the disclosed device within a cabin area, according to the present disclosure.
Figure 6:
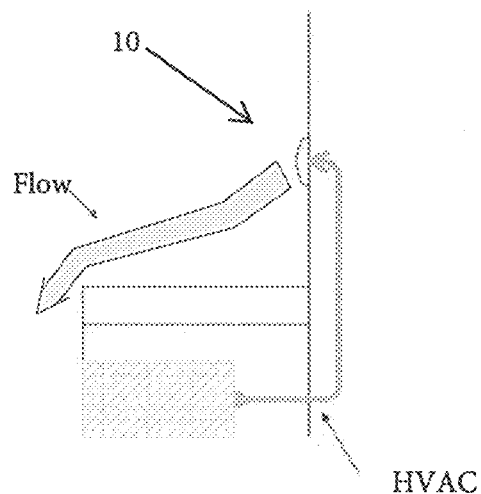
FIG. 6 is an end view of the disclosed device within a cabin area, according to the present disclosure.
Figure 7:
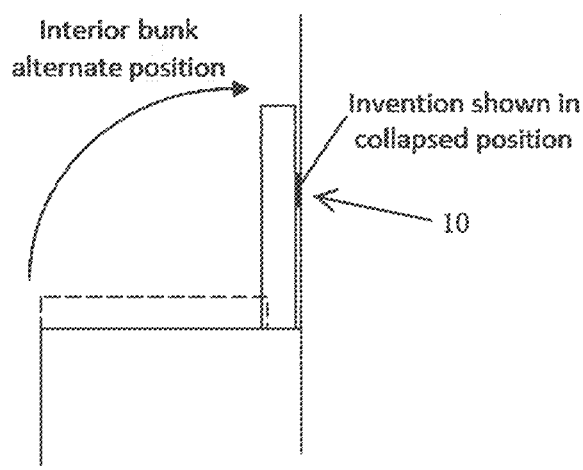
FIG. 7 is an end of the disclosed device within a cabin area in a collapsed state, according to the present disclosure.
Figure 8:
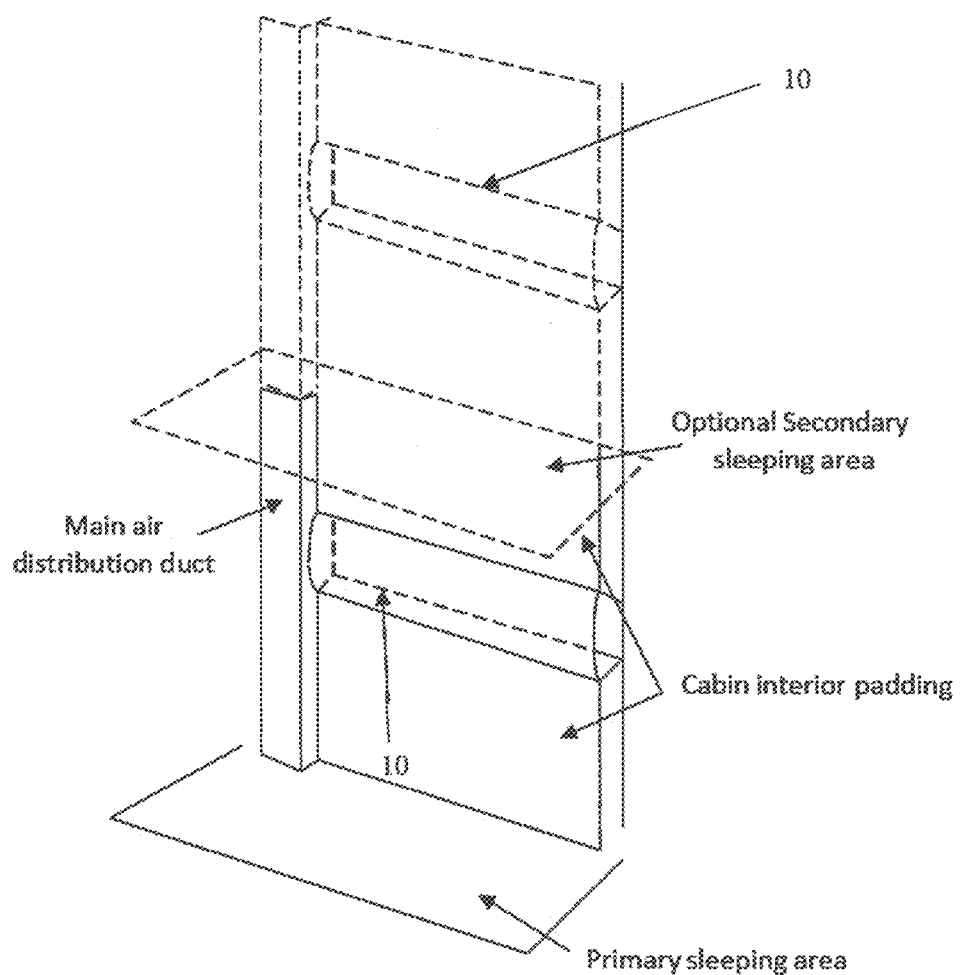
FIG. 8 is an isometric view of the disclosed device integrated within an interior space, according to the present disclosure.

Whenever air movement is created within a defined region and the moving air is distinct from stationary or stagnant air, stagnant air will tend to attach to the moving airflow and thus become mobile. If there is significant large-scale turbulence in the moving air flow, significant mixing will occur between the moving air and stagnant air. When it is desirable to keep the temperature between the flowing air and the stagnant air different, mixing of the air should therefore be avoided. Additional features may be applied to improve and supplement the device 10 main function and enhance temperature stratification within the interior space the device 10 is utilized within. For example, as is seen in FIG. 3, changing the shape of the front face 102 of the device 10 by adding a sharp edge 125 can define a separation point in the flow regimes between the conditioned flowing air and stagnant un-conditioned air within the cabin. Alternately, as is seen in FIG. 4, adding a moveable flap 126 having a fixed end 1261 and a free end 1262 to the front side 102 of the device 10 can also help to provide separation between moving conditioned air and un-conditioned air above the conditioned zone. In this embodiment, when airflow is moving out of the front side 102 of the device 10, momentum of the flowing air through the holes 120 helps to extend and direct the flap 126 such that the free end 1262 of the flap 126 is perfectly situated at the boundary between the flowing conditioned air and the stagnant un-conditioned air within the truck cabin promoting separation between the two regions. When airflow is discontinued, the flap 126 retracts so as not to be a nuisance within the interior of the cabin.

Another location where conditioned air and un-conditioned air potentially mix is at the entrance to the air conditioning equipment. If air mixing of un-conditioned air and conditioned air occurs at this location, there is an increased need for air conditioning by the air conditioning equipment which is energy intensive. However, when precisely conditioned air is returned to the inlet of the air conditioning equipment exclusively, less energy is required to maintain temperature and humidity control. When oriented correctly, a physical barrier 300 near the inlet of a HVAC equipment inlet can help to convey conditioned previously conditioned air directly toward the inlet of the HVAC equipment. The physical barrier 300 can be permanent or temporary and can have several different configurations such as, but not limited to, a simple moveable curtain, a rigid barrier made of cardboard, plastic, or other rigid material, or an inflatable or partially inflatable barrier which can deploy when the HVAC system is active. Since the barrier 300 can sufficiently direct conditioned air toward the inlet of the device 10 and does not need to extend fully upward, the occupant benefits from maintaining a zone of comfort while not feeling closed in by a full curtain.

This same approach may be used with heating, although the return air vent and barrier 300 may be more ideally located toward the top portion of the vehicle cabin to maximize the temperature stratification caused by the lower density (higher buoyancy) of warmer air. A damper or other valving device may be used to select between summer (cooling) operation or winter (heating) operation and the damper device may be either physically operated by the user or automatically operated by the HVAC system or an extension of the disclosed device 10.

The device 10 of the present disclosure may be incorporated into an interior panel(s) such that the integration looks seamless yet still provides the advantage of uniform air distribution in new vehicles. Air distribution within the interior space is benefited by having multiple small discharge points to keep relative air velocity low and uniform in order to provide maximum comfort to the occupant.

Alternately, the device 10 of the present disclosure may be added to the vehicle or other interior space after original manufacture and coupled to the existing air distribution ductwork or new connection points may be added to convey conditioned air from the air conditioning system to the device 10 and finally to the occupant.

The disclosed device 10 has a strong advantage over rigid ductwork in that it may be manufactured as a whole or partial assembly and easily folded and packed for transport or shipping before being installed or stored for other reasons. Upon installation, the device 10 may be unfolded in whole or part, located within the space requiring conditioned airflow, and minimally located or secured within the structure to be conditioned. When designed correctly, the relative difference of air pressure within the channel 103 compared to air pressure outside of the cavity 103 opposite the front side 102 will support the device 10 flexibility and allow unimpeded airflow within the structure. An application of positive air pressure within the device 10 may also serve to inflate and allow the device 10 to achieve the operational shape without excessive external structure or help from an occupant, when the front side 102 is constructed out of a fabric material.

When the device 10 is in the form of a flexible duct, such as fabric, and placed adjacent to an upper bunk, simply closing the bunk can serve to turn off air distribution to the unused space. Alternately, or in addition, a damper control valve may be situated within the air supply duct such that the damper is moved between an open position and a closed position relative to the position of the of the folding bunk bed. Accordingly, when this assembly is utilized, the damper control valve is placed in the closed position when the bunk is closed ensuring that the full conditioned air supply is turned off in the region where conditioned air is not needed.

The disclosed device has a strong advantage when used over rigid ductwork in that the preferred construction method and materials used to produce the device 10 are a semi-rigid sheet plastic that is generally resilient and compliant, or a fabric. Accordingly, the selection of these material types for the device 10 are preferred as they are very light weight, strong, and durable generally providing for long years of service. Different weights and thicknesses of construction materials of the device 10 may also serve to thermally insulate the walls of the device 10 and therefore reduce heat transfer through the walls of the device 10.

Figure 9:
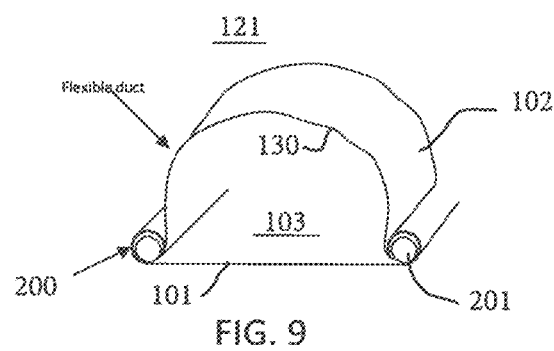
FIG. 9 is an isometric view of the disclosed device with an external structure, according to the present disclosure.
Figure 10:
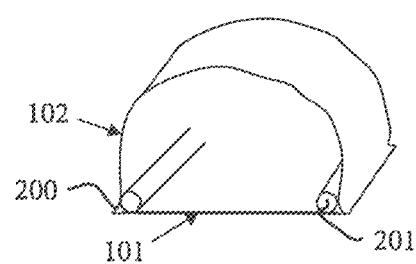
FIG. 10 is an isometric view of the disclosed device with an internal structure, according to the present disclosure.

As is shown in FIGS. 9-10, the device 10 may include rigid or semi rigid stiffener/support members 200 added to the device 10 in strategic locations along the length of the flexible front side 102 of the device 10 to promote smooth airflow within the channel 103 and reduce the possibility of the front side 102 flapping or rattling when there is rapid airflow within the channel 103. The stiffener/support members 200 may further provide a mechanical attachment point for installation when the device 10 is not inflated but still deployed. The stiffener/support members 200 may be added to the outside 121 of the front side 102 (FIG. 9) or placed on the inside 130 of the front side 102 within the channel 103 (FIG. 10).

In an assembly implementation of the device 10, the stiffer/support members 200 may be comprised of a flexible bead 201 that is placed within the rigid support structure and held from the outside (FIG. 9). Alternately, the flexible bead 201 may trap the support structure within the device 10 interior (FIG. 10). Alternately, simple bonding or other mechanical attachment of the support members 200 to the flexible front side 102 is also a viable option. In the preferred embodiment of the device 10, the stiffener/support members 200 are visibly unobtrusive and may include features to locate and secure the device 10 to existing interior panels with minimal installation intervention.

In an assembly where the device 10 is placed and assembled within an existing vehicle, the device 10 installation may require the addition of rigid ductwork securely mounted to the truck cabin and thereby providing airflow to the flexible device 10 as disclosed. Alternately, rigid ductwork structures may be employed where air velocity is high or when airflow is in directional transition. In other installations into existing structures where the internal airflow or relative air velocity is not so high (Renolds number below 20,000) or no airflow transition is required, the device 10 may exclusively employ the flexible ductwork described and disclosed along with the exit hole pattern to allow uniform air distribution within the conditioned space.

Airflow control throughout the HVAC system the device 10 is utilized within may be influenced by the occupant through known several methods such as, but not limited to, controlling the speed of the air delivery device (fan) such that the total airflow through the invention increases, utilizing a system of damper valves and flow restriction devices to increase airflow to a location where desired such as, but not limited to, head and upper torso and reduce airflow through an un-used region such as an upper bunk, and increasing airflow within a specific region by controlling an opening in the air distribution duct, such that increased airflow is directed toward the occupant. Specifically, in the case of the flexible front side 102 of the device 10, a zipper may be used to increase airflow to a region within the conditioned space. Further, a more elaborate flow control device, such as, but not limited to an iris valve or mechanical blockage style valve mounted on the surface of device 10 and within the channel 103 may be utilized to manage airflow.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed:

1. A device to direct a flow of conditioned air within a larger volume to establish a distinct zone of conditioned air within the larger volume, the device comprising:

a backside, the backside generally planar and configured for a coupling to a vertical structure defining the larger volume; and a front side, the front side coupled to the backside to generally define a channel for capturing the flow of conditioned air, the front side comprised of a pliable material being comprised of woven fabric material configured with an air permeable portion and an air impermeable portion, wherein the air permeable portion releases the captured flow at a uniform velocity across an entire length of the air permeable portion, wherein the air permeable portion is defined by pores between threads of the woven fabric allowing for the releasing of a discrete amount of air jets from the channel into the larger volume, wherein the discrete amount of air jets selectively provides conditioned air to the distinct zone, wherein the distinct zone is a smaller volume within the larger volume.

2. The device as in claim 1, wherein the front side includes a plurality of pores, the pores each have a size, the size of each of the plurality of pores increasing in proportion to a distance from an entrance of airflow within the device to provide a uniform flow across an entire length of the air permeable portion.

3. The device as in claim 2, wherein each pore of the plurality of pores is spaced a distance from each other, the distance between each pore decreasing in proportion to a distance from an entrance of airflow, wherein a number of pores increases as the distance from the entrance increases to provide a uniform flow across an entire length of the air permeable portion.

4. The device as in claim 1, wherein the front side and back side define an interior diameter of the channel, the interior diameter of the channel decreasing in proportion to a distance from an entrance of airflow, wherein the channel narrows as the distance from the entrance increases.

5. The device as in claim 1, wherein the device is installed into an existing HVAC system of the larger volume, wherein the device is coupled to an aperture within a wall of the larger volume aligned with an existing duct.

6. A device to direct a flow of conditioned air within a larger volume to establish a distinct zone of conditioned air within the larger volume, the device comprising:
   a backside, the backside comprising a rigid planar material and configured for a coupling to a vertical structure defining the larger volume;
   a front side, the front side having an air permeable portion and an air impermeable portion, and coupled to the backside to generally define a channel for capturing the flow of conditioned air, the front side comprised of a pliable material comprised of woven fabric material, wherein the air permeable portion is defined by pores between threads of the woven fabric allowing for the releasing of a discrete amount of air jets from the channel into the larger volume across an entire length of the air permeable portion;
   a first end, the first end being a seal of the front side and backside adjacent to an entrance, wherein air flow is restricted from exiting; and
   a second end, the second end opposite the first end and a distance from the first end to the second end defining a length of the device, the second end being a seal of the front side and backside, wherein air flow is restricted from exiting.

7. The device as in claim 6, wherein the front side includes a plurality of pores, with each pore of the plurality of pores having a size, the size of each of the plurality of pores increasing in proportion to a distance from the entrance of airflow within the device to provide the uniform flow across an entire length of the air permeable portion.

8. The device as in claim 6, wherein the front side includes a plurality of pores, with each pore of the plurality of pores spaced a distance from each other, the distance between each pore decreasing in proportion to a distance from the entrance of airflow, wherein a number of pores increases as the distance from the entrance increases to provide the uniform flow across an entire length of the air permeable portion.

9. The device as in claim 6, wherein the front side and back side define an interior diameter of the channel, the interior diameter of the channel decreasing along the length of the device, from the first end to the second end, wherein the channel narrows from the first end to the second end.

10. The device as in claim 6, wherein the device is installed into an existing HVAC system of the larger volume, wherein the device is coupled to an aperture within a wall of the larger volume aligned with an existing duct.

11. The device as in claim 6, wherein a flow of conditioned air is captured in the channel with a first direction parallel to the front side, and wherein the flow of conditioned air changes direction and reduces in velocity when being released as the discrete amount of air jets exiting through the air permeable portion and wherein the discrete amount of air jets is directed normal to the front side and the velocity of any of the individual jets is lower than the velocity of the flow of conditioned air captured in the channel.

* * * * *